United States Patent
McGuire, Jr. et al.

(10) Patent No.: US 9,190,115 B2
(45) Date of Patent: Nov. 17, 2015

(54) METHOD OF ASSEMBLING A DISK DRIVE

(75) Inventors: James E. McGuire, Jr., Westerville, OH (US); Andrew C. Strange, Worthington, OH (US)

(73) Assignee: entrotech, inc., Columbus, OH (US)

( * ) Notice: Subject to any disclaimer, the term of this patent is extended or adjusted under 35 U.S.C. 154(b) by 0 days.

(21) Appl. No.: 13/458,296

(22) Filed: Apr. 27, 2012

(65) Prior Publication Data
US 2012/0275052 A1    Nov. 1, 2012

Related U.S. Application Data

(60) Provisional application No. 61/480,243, filed on Apr. 28, 2011.

(51) Int. Cl.
| | | |
|---|---|---|
| *G11B 5/127* | (2006.01) | |
| *H04R 31/00* | (2006.01) | |
| *G11B 33/14* | (2006.01) | |
| *G11B 33/02* | (2006.01) | |

(52) U.S. Cl.
CPC .......... *G11B 33/1466* (2013.01); *G11B 33/022* (2013.01); *Y10T 29/49004* (2015.01)

(58) Field of Classification Search
USPC ............ 29/603.03–603.07; 360/97.02, 97.04, 360/121, 122, 317; 361/685, 760, 800; 174/250, 262, 526, 535; 428/457, 461, 428/462

See application file for complete search history.

(56) References Cited

U.S. PATENT DOCUMENTS

| | | | |
|---|---|---|---|
| 4,306,259 A | 12/1981 | Saito et al. | |
| 4,367,503 A | 1/1983 | Treseder | |
| 4,642,715 A | 2/1987 | Ende | |
| 4,686,592 A | 8/1987 | Carroll et al. | |
| 4,795,907 A * | 1/1989 | Maekawa et al. | 250/352 |
| 4,855,849 A | 8/1989 | Jones et al. | |
| 4,965,691 A | 10/1990 | Iftikar et al. | |

(Continued)

FOREIGN PATENT DOCUMENTS

| | | |
|---|---|---|
| EP | 0 546 680 | 6/1993 |
| JP | 6-218799 | 8/1994 |

(Continued)

OTHER PUBLICATIONS

"Donaldson Filtration Systems Adsorbent Label Filter (ALF): Disk Drive," Donaldson Company, Inc., Minneapolis, MN (Jul. 31, 2010).

(Continued)

*Primary Examiner* — Paul D Kim
(74) *Attorney, Agent, or Firm* — The Griffith Law Firm, A P.C.; Lisa M. Griffith (57) ABSTRACT

A method of assembling a disk drive according to the invention comprises steps of: providing a base component of a housing of the disk drive; providing a cover component of the housing; mating the base component and the cover component to form an enclosed housing that encloses disk drive components for operation of the disk drive; and sealing the disk drive using low thermal energy bonding. A hermetically sealed disk drive of the invention comprises: a housing comprising a base and a cover; and disk drive components enclosed within the housing for operation of the disk drive, wherein the housing comprises a bondline continuously extending around a periphery of the housing for sealing the same.

27 Claims, 3 Drawing Sheets

(56) References Cited

U.S. PATENT DOCUMENTS

| | | | |
|---|---|---|---|
| 5,025,335 A | 6/1991 | Stefansky | |
| 5,150,267 A * | 9/1992 | Reinisch | 360/99.19 |
| 5,175,657 A | 12/1992 | Iftikar et al. | |
| 5,214,550 A | 5/1993 | Chan | |
| 5,233,491 A | 8/1993 | Kadonaga et al. | |
| 5,235,481 A | 8/1993 | Kamo et al. | |
| 5,243,495 A | 9/1993 | Read et al. | |
| 5,247,410 A | 9/1993 | Ebihara et al. | |
| 5,253,129 A | 10/1993 | Blackborow et al. | |
| 5,270,887 A | 12/1993 | Edwards et al. | |
| 5,282,099 A | 1/1994 | Kawagoe et al. | |
| 5,317,463 A | 5/1994 | Lemke et al. | |
| 5,454,157 A | 10/1995 | Ananth et al. | |
| 5,536,917 A | 7/1996 | Suppelsa et al. | |
| 5,559,650 A | 9/1996 | Repphun et al. | |
| 5,587,854 A | 12/1996 | Sato et al. | |
| 5,587,855 A | 12/1996 | Kim | |
| 5,608,592 A | 3/1997 | Mizoshita et al. | |
| 5,703,735 A | 12/1997 | Bleeke | |
| 5,732,063 A | 3/1998 | Chen | |
| 5,751,514 A | 5/1998 | Hyde et al. | |
| 5,781,373 A | 7/1998 | Larson et al. | |
| 5,837,934 A | 11/1998 | Valavanis et al. | |
| 5,880,904 A | 3/1999 | Mizoshita et al. | |
| 5,898,537 A | 4/1999 | Oizumi et al. | |
| 5,969,901 A | 10/1999 | Eckberg et al. | |
| 6,008,965 A | 12/1999 | Izumi et al. | |
| 6,023,392 A | 2/2000 | Kim | |
| 6,108,164 A | 8/2000 | Weber | |
| 6,129,579 A | 10/2000 | Cox et al. | |
| 6,168,459 B1 | 1/2001 | Cox et al. | |
| 6,181,530 B1 | 1/2001 | Ratliff et al. | |
| 6,226,143 B1 | 5/2001 | Stefanksy | |
| 6,236,532 B1 | 5/2001 | Yanagisawa | |
| 6,243,262 B1 | 6/2001 | Koo et al. | |
| 6,258,432 B1 | 7/2001 | Terada et al. | |
| 6,317,286 B1 | 11/2001 | Murphy et al. | |
| 6,339,521 B1 | 1/2002 | Durrum et al. | |
| 6,392,838 B1 | 5/2002 | Hearn et al. | |
| 6,397,932 B1 | 6/2002 | Calaman et al. | |
| 6,407,659 B2 | 6/2002 | Mochida et al. | |
| 6,430,000 B1 | 8/2002 | Rent | |
| 6,442,021 B1 | 8/2002 | Bolognia et al. | |
| 6,469,864 B2 | 10/2002 | Kamezawa et al. | |
| 6,473,264 B2 | 10/2002 | Bae et al. | |
| 6,480,353 B1 | 11/2002 | Sacks et al. | |
| 6,525,899 B2 | 2/2003 | Hearn et al. | |
| 6,560,064 B1 | 5/2003 | Hirano | |
| 6,570,736 B2 | 5/2003 | Noda | |
| 6,639,757 B2 | 10/2003 | Morley et al. | |
| 6,646,821 B2 | 11/2003 | Bernett et al. | |
| 6,650,961 B2 | 11/2003 | Deckers | |
| 6,673,460 B2 * | 1/2004 | Imai et al. | 428/462 |
| 6,678,112 B1 | 1/2004 | Kaneko | |
| 6,693,767 B1 | 2/2004 | Butler | |
| 6,762,909 B2 | 7/2004 | Albrecht et al. | |
| 6,765,751 B2 | 7/2004 | Huang et al. | |
| 6,785,082 B2 | 8/2004 | Fiorvanti et al. | |
| 6,831,811 B1 | 12/2004 | Andrikowich et al. | |
| 6,876,514 B1 | 4/2005 | Little | |
| 6,934,118 B2 | 8/2005 | Hidaka et al. | |
| 6,934,958 B2 | 8/2005 | Lin et al. | |
| 6,940,687 B2 | 9/2005 | Hong et al. | |
| 7,054,153 B2 | 5/2006 | Lewis et al. | |
| 7,082,012 B2 | 7/2006 | MacPherson et al. | |
| 7,119,984 B2 | 10/2006 | Macleod et al. | |
| 7,130,149 B2 | 10/2006 | Hong et al. | |
| 7,206,164 B2 | 4/2007 | Hofland et al. | |
| 7,218,473 B2 | 5/2007 | Bernett et al. | |
| 7,239,593 B2 | 7/2007 | Abe | |
| 7,274,534 B1 | 9/2007 | Choy et al. | |
| 7,295,399 B2 * | 11/2007 | Konno et al. | 360/99.02 |
| 7,300,500 B2 | 11/2007 | Okada et al. | |
| 7,301,776 B1 | 11/2007 | Wang et al. | |
| 7,315,447 B2 | 1/2008 | Inoue et al. | |
| 7,330,334 B2 | 2/2008 | Shimizu et al. | |
| 7,362,541 B2 * | 4/2008 | Bernett et al. | 360/99.21 |
| 7,414,813 B2 | 8/2008 | Huynh | |
| 7,420,771 B1 | 9/2008 | Hanke et al. | |
| 7,484,291 B1 | 2/2009 | Ostrander et al. | |
| 7,508,622 B2 | 3/2009 | Martin et al. | |
| 7,525,758 B2 | 4/2009 | Abe | |
| 7,616,400 B2 | 11/2009 | Byun et al. | |
| 7,630,169 B2 | 12/2009 | Murakami | |
| 7,684,146 B1 | 3/2010 | Andrikowich et al. | |
| 7,813,129 B2 | 10/2010 | Van Der Werff | |
| 7,821,735 B1 * | 10/2010 | Bogacz et al. | 360/99.21 |
| 8,014,167 B2 | 9/2011 | Gunderson et al. | |
| 8,018,687 B1 | 9/2011 | Little et al. | |
| 8,248,777 B2 | 8/2012 | Prest | |
| 8,274,755 B2 | 9/2012 | Ishima et al. | |
| 8,427,787 B2 | 4/2013 | McGuire, Jr. | |
| 8,533,934 B2 | 9/2013 | McGuire et al. | |
| 8,593,760 B2 | 11/2013 | McGuire | |
| 8,599,514 B2 | 12/2013 | McGuire | |
| 8,659,849 B2 | 2/2014 | Hayakawa et al. | |
| 2001/0042301 A1 | 11/2001 | Khuu | |
| 2002/0149885 A1 | 10/2002 | Dague et al. | |
| 2002/0196580 A1 | 12/2002 | Tsukahara et al. | |
| 2003/0081349 A1 | 5/2003 | Bernett | |
| 2003/0089417 A1 | 5/2003 | Bernett | |
| 2003/0179488 A1 | 9/2003 | Kant et al. | |
| 2003/0179489 A1 | 9/2003 | Bernett et al. | |
| 2003/0223148 A1 | 12/2003 | Macleod et al. | |
| 2004/0070867 A1 | 4/2004 | Kudo et al. | |
| 2004/0150909 A1 | 8/2004 | Kimura | |
| 2004/0169956 A1 | 9/2004 | Oba et al. | |
| 2004/0184184 A1 | 9/2004 | Komatsu et al. | |
| 2004/0207980 A1 | 10/2004 | Kobayashi | |
| 2005/0013039 A1 | 1/2005 | Matsumura et al. | |
| 2005/0041334 A1 | 2/2005 | Kim et al. | |
| 2005/0094312 A1 | 5/2005 | Sato | |
| 2005/0130457 A1 | 6/2005 | Nozaki et al. | |
| 2005/0237708 A1 | 10/2005 | Chen | |
| 2006/0050429 A1 | 3/2006 | Gunderson et al. | |
| 2006/0139873 A1 | 6/2006 | Tomizawa et al. | |
| 2007/0002489 A1 | 1/2007 | Abe | |
| 2007/0171567 A1 | 7/2007 | Choi et al. | |
| 2008/0084631 A1 | 4/2008 | Chan et al. | |
| 2008/0174910 A1 | 7/2008 | Hirono et al. | |
| 2008/0212237 A1 | 9/2008 | Uefune et al. | |
| 2008/0226534 A1 | 9/2008 | Gidumal et al. | |
| 2009/0073328 A1 | 3/2009 | Gunderson et al. | |
| 2009/0073842 A1 | 3/2009 | Kim | |
| 2009/0116141 A1 | 5/2009 | Brown | |
| 2009/0183475 A1 | 7/2009 | Dauber et al. | |
| 2011/0122567 A1 | 5/2011 | Cheah et al. | |
| 2011/0212281 A1 | 9/2011 | Jacoby et al. | |
| 2012/0120562 A1 | 5/2012 | Prest et al. | |
| 2012/0275053 A1 | 11/2012 | McGuire | |
| 2012/0275054 A1 | 11/2012 | McGuire | |
| 2012/0275055 A1 | 11/2012 | McGuire | |
| 2012/0275056 A1 | 11/2012 | McGuire | |
| 2012/0275057 A1 | 11/2012 | McGuire | |
| 2012/0275105 A1 | 11/2012 | McGuire | |
| 2012/0275106 A1 | 11/2012 | McGuire | |
| 2012/0275285 A1 | 11/2012 | McGuire | |
| 2012/0275286 A1 | 11/2012 | McGuire | |
| 2012/0275287 A1 | 11/2012 | McGuire | |

FOREIGN PATENT DOCUMENTS

| | | |
|---|---|---|
| JP | 2000215642 A * | 8/2000 |
| WO | WO 2005/117018 | 12/2005 |

OTHER PUBLICATIONS

"Donaldson Filtration Systems Adsorbent Pouch Filter (APF): Disk Drive," Donaldson Company, Inc., Minneapolis, MN (Jul. 31, 2010).
"Infrared," http://en.wikipedia.org/wiki/Infrared (Feb. 14, 2011).
"Laser Makes Invisible Welds in Plastics," Connect, No. 100; http://www.twi.co.uk/content/c1008b.html (May 31, 1999).
"Laser Welding of Plastics (Knowledge Summary)," http://www.twi.co.uk/content/ksab002.html (Dec. 31, 2009).

(56) References Cited

OTHER PUBLICATIONS

"Nd:YAG laser," http://en.wikipedia.org/wiki/Nd:YAG_laser (Feb. 14, 2011).

Jones, Ian, "Clearweld (Knowledge Summary)," http://www.twi.co.uk/content/ksiaj001.html (Dec. 31, 2010).

Venkat, Sri et al., "Sealing Plastic Seams With Laser Welding," www.devicelink.com/mddi (May 31, 2008).

Warwick, Marcus et al., "Application Studies Using Through-Transmission Laser Welding of Polymers," http://www.twi.co.uk/content/spcmwapr2006.html (Apr. 25, 2006).

"First Hermetically Sealed, Helium HDD Platform Provides Path for Higher Capacity Storage, While Significantly Lowering Power and Cooling, and Improving Storage Density," http://www.hgst.com/press-room/press-releases/hgst-ships-6TB-Ultrastar-HE6-helium-filled (Nov. 4, 2013).

* cited by examiner

METHOD OF ASSEMBLING A DISK DRIVE

CROSS-REFERENCE TO RELATED APPLICATIONS

This application claims the benefit of U.S. Provisional Patent Application No. 61/480,243, filed on Apr. 28, 2011.

BACKGROUND OF THE INVENTION

The present invention relates generally to methods and apparatus for sealing disk drives using low thermal energy bonding techniques.

A disk drive is a device used to store information in a computing environment. In a disk drive, data is generally recorded on planar, round, rotating surfaces (which are commonly referred to as disks, discs, or platters). There are several types of disk drives, including optical disk drives, floppy disk drives, and hard disk drives. Nowadays, hard disk drives tend to be most common. Strictly speaking, "drive" refers to a device distinct from its medium, such as a tape drive and its tape, or a floppy disk drive and its floppy disk. A hard disk drive (sometimes referred to as a HDD), also referred to as a hard drive, hard disk, or fixed disk drive, is a non-volatile storage device that stores digitally encoded data on rapidly rotating platters with magnetic surfaces. Early hard disk drives had removable media; however, a HDD today is typically an encased unit with fixed media.

A typical hard disk drive includes a head disk assembly (HDA) and a printed circuit board assembly (PCBA) attached to a disk drive base of the HDA. The HDA typically includes at least one magnetic disk, a spindle motor for rotating the disk, and a head stack assembly (HSA) having an actuator assembly with at least one transducer head, typically several, for reading and writing data from the disk. The PCBA includes a servo control system in the form of a disk controller for generating servo control signals. The HSA is controllably positioned in response to the generated servo control signals from the disk controller. In so doing, the attached heads are moved relative to tracks disposed upon the disk. The heads are typically distanced from the magnetic disk by a gaseous cushion—so that they are said to "fly" over the disk. Thus, it is important that the position of the heads be well-controlled for proper reading and writing from the disk.

Hard disk drives are generally sealed to prevent dust and other external sources of contamination from interfering with operation of the hard disk heads therein. Some hard disk drives are hermetically sealed. A hermetic seal is generally understood to be an airtight seal. Note that some seals (e.g., those "sealing" air within the hard disk drive) are not literally air tight, but rather utilize an extremely fine air filter in conjunction with air circulation inside the hard drive enclosure. The spinning of the disks causes air to circulate therein, forcing any particulates to become trapped on the filter. The same air currents also act as a gas bearing, which enables the heads to float on a cushion of air above the surfaces of the disks. However, "hermetically" sealed means that the seal is so airtight that the disk drive's internal pressure is substantially independent of the external or ambient pressure. This is in contrast to a conventional or non-hermetically sealed disk drive that has a breather port with a filter in a wall of the base plate or cover for equalizing the disk drive's internal pressure with the external pressure. Thus, a hermetically sealed drive does not contain a breather port.

Within a hermetically sealed hard disk drive, gases other than atmospheric air are often employed. Filling the sealed environment of a hard disk drive with gases other than air can enhance their performance. For example, use of lower density inert gases, such as helium, can reduce aerodynamic drag between the disks and their associated read/write heads by a factor of approximately five-to-one as compared to their operation in air. This reduced drag beneficially results in reduced power requirements for the spindle motor. A helium-filled drive, thus, uses substantially less power than a comparable hard disk drive operating in an air environment. At the same time, the helium gas also conducts heat generated during operation of the disk drive away more effectively than air.

Hermetically sealed hard disk drives are first filled with a desired gaseous medium (whether it be atmospheric air or one or more other gases) before operation. Then, if the constituency of the gaseous medium substantially changes due to leakage of the hard disk drive housing, the hard disk drive must be either discarded or refilled with the desired gaseous medium. Filling disk drives to a desired pressure and concentration of gaseous components, however, can be both time-consuming and difficult. A number of patent documents focus on providing and/or replenishing gases such as helium at a desired concentration within a hard disk drive. See, for example, U.S. Patent Publication Nos. 2003/0081349 and 2003/0089417. Also see U.S. Pat. No. 6,560,064.

Due to imperfect sealing of hard disk drive housings, the benefits of using lower density gases such as helium are conventionally not longstanding. Potential paths of leakage (allowing both air flow into the hard disk drive housing and allowing gas outflow from the hard disk drive housing) include those paths existing at the junction of two mating components thereof. Those components include, for example, screws or other mechanical fasteners used to conventionally fasten multiple parts of the housing together. In addition, gasket seals and the like used to improve the seal between multiple components are often susceptible to at least some leakage. As gas such as helium leaks out of a sealed hard disk drive, air leaks in (or vice versa), causing undesirable effects in the operation of the disk drives—even possibly causing the disk drives to catastrophically fail. For example, an increased concentration of air inside the hard disk drive may increase forces on the read/write head therein due to turbulent airflow within the drive. Further, such undesired air may cause the read/write heads to "fly" at too great a distance above the disks. The risk of unexpected failure due to inadequate concentration of helium within such drives is a considerable drawback to helium-filled disk drives, particularly since the data stored within the disk drive can be irretrievably lost if the disk drive fails.

Therefore, as discussed in U.S. Patent Publication No. 2003/0179489, despite the advantages of helium-filled drives, such drives have not been commercially successful. This is mainly due to problems associated with leakage of gas from within the drives over time. Unlike air-filled disk drives, helium-filled drives do not include a filtered port to equalize the pressure within the drive to the ambient pressure—which ensuing pressure differential contributes to increased leakage of gas. Thus, while prior art helium drives are completely "sealed" in the conventional sense, it is still possible for helium gas therein to leak out past conventional rubber gasket seals used to seal the top cover to the drive base. Such leakage is not surprising given the relatively smaller size (i.e., lower atomic weight) of the helium atoms in comparison to the constituent gases found in air (i.e., nitrogen and oxygen). That is, the rubber gasket seals on prior art drives allow the relatively smaller helium atoms to diffuse through the rubber membrane. Indeed, such prior art gasket seals do not provide hermetic seals with respect to air (i.e., the gasket seals are also permeable to the larger atoms of nitrogen and oxygen in air) since it is air that typically displaces the helium gas that leaks from the drive.

Most prior art gasket seals are only intended to keep relatively large contaminants such as dust or smoke from the interior of a disk drive. However, such gasket seals are preferred as compared to other, more permanent methods of sealing a drive for two main reasons. First, such seals typically do not outgas and, thus, do not contribute to the contamination of the interior of the drive. Secondly, such seals may be reused if necessary during the assembly of the disk drive, such as when an assembled drive fails to pass certification testing and must be "re-worked." Re-working a drive typically entails removing the top cover from the base and replacing a defective disk or read/write head while the drive is still in a clean room environment. The reworked drive is then reassembled, which can even be done using the same rubber gasket seal positioned between the base and the top cover. Unfortunately, however, while such gasket seals are convenient, they simply often do not provide a sufficient hermetic seal to maintain the required concentration of helium (or other low density gas) within the disk drive for the desired service life of the drive.

In view of the potential for long-term performance problems, U.S. Patent Publication No. 2003/0179489 describes a disk drive assembly having a sealed housing. As described therein, a disc drive includes a base plate supporting a spindle motor and an actuator assembly. A structural cover is removably attached to the base plate to form an internal environment within the disc drive. The internal environment of the drive is filled with a low density gas such as helium, and a sealing cover is permanently attached to the base plate and the structural cover to form a hermetic seal that maintains a predetermined concentration of the low density gas within the internal environment over a service lifetime of the disc drive.

The disc drive further includes a first seal secured between the base plate and the structural cover to prevent contaminants from entering the internal environment of the disc drive. The first seal is formed from a material such as rubber that allows leakage of the low density gas from the internal environment at a sufficiently low rate so that the disc drive may be operated for a predetermined period of time in the absence of the sealing cover.

In one embodiment, the base plate includes a raised outer edge and the sealing cover includes a downward depending edge that is adhesively bonded within a groove formed between an outer surface of the structural cover and the raised outer edge of the base plate. Alternatively, the sealing cover may include a downward depending edge that is adhesively secured to an outer perimeter wall of the base plate. In an alternative embodiment, the sealing cover is soldered to a top surface of the raised outer edge of the base plate. Such assemblies purportedly create a hermetic seal that will maintain desired concentrations of helium (or other low density gases) within the drive over the operational lifespan of the drive (e.g., leaking helium at such a low rate that it would take over seventy years for the helium concentration to drop below a predetermined lower limit). However, such sealing covers are not without their limitations—e.g., those dimensional limitations discussed in U.S. Patent Publication No. 2003/0179489 and the potential interference of such sealing covers with electrical connectors, such as those associated with flex circuitry protruding from the disk drive. Thus, improvements are still needed.

In addition, while U.S. Patent Publication No. 2003/0223148 (corresponding to U.S. Pat. No. 7,119,984) discusses improved containment of helium within a hard disk drive, the methods therein rely on laser-based metal sealing of such drives. Further, such "sealing" of drives is incomplete in that it does not prevent leakage through valves and ports used to inject gas into disk drive housings once sealed as such. As described therein, a base can be combined with a cover by overlapping respectively corresponding coupling flanges of the base and cover with each other. The coupling flanges are then described as being jointed and fastened together by spot welding, but only if both of the base and cover are made of metal including iron. Alternatively, hermetic sealing to some extent is said to be guaranteed if seam-welding is effected by continuously carrying out spot welding. Alternatively, when the base and the cover are made of a metal other than iron or a resin material, the coupling flanges are described as being joined together by means such as wrap-seaming, screws, or riveting. Still further, if both the base and cover are made of metal including aluminum or made of a resin material, the coupling flanges are stated to be preferably jointed and fastened together by screws or rivets. Further, in the outer peripheral portion of the jointed coupling flanges, a frame composed of a pair of L-shaped frame elements can be attached to force the jointed coupling flanges to be closed up tightly. Each of these L-shaped frame elements are made of so-called engineering plastic, e.g., polyamide resin or polyphenylene sulfide resin, and have a sectional form with a recess corresponding to the outer shape of the jointed coupling flanges. In this case, the L-shaped frame elements are fixed to the jointed coupling flanges of the housing by adhesive or by welding the frame elements per se. Also see U.S. Pat. No. 6,762,909 for a description of laser welding of a disk drive's cover and base plate made of aluminum or other alloys. Similarly, U.S. Pat. No. 5,608,592 discusses how spot welding can be used to secure a base and cover of a disk drive housing.

U.S. Pat. No. 4,686,592 discloses a housing comprising a lower body portion and a cover portion. Lower body portion is stated to be cylindrical in shape, having a lip located towards the outer periphery and a ledge associated therewith. Cover portion is stated to have a lip portion along its outer periphery. The inner and outer diameter of the lips are selected so that the two lips nest with one another when the cover portion is placed over the lower body portion, i.e., the outer diameter of the lower body portion's lip is selected to be greater than the inner diameter of the cover portion's lip. Further, the height of the cover portion's lip is selected with respect to the height of the lower body portion's lip so that a groove is formed for accommodating the outer periphery of the disk. Adhesives, such as epoxy, can be applied in the groove to assist in fixedly securing the disk within the groove. The disk is further secured in the groove by the clamping action provided by the cover portion and the lower body portion. Alternative methods for securing the cover portion to the lower body portion described therein include: threading, cam-locking, radial crimping, laser welding, ultrasonic welding, and the like.

U.S. Pat. Nos. 6,392,838 and 6,525,899 disclose a disk drive assembly purportedly hermetically encased within a metallic can. The metallic can comprises a top and bottom housing. Each housing component includes a sealing flange extending around its periphery. After the disk drive assembly is securely placed into the bottom housing, the top and bottom housings are mated and sealed together by forming a seam seal with the seal flanges. Also disclosed is use of a metallic gasket seal having a C-shaped cross-sectional area to purportedly hermetically seal a disk drive assembly. The C-seal includes a base layer and a plating layer, with the length of the seal extending the periphery of the disk drive base, similar to conventional elastomer gasket seals. After the disk drive cover is placed over the disk drive base and C-seal, the cover is clamped, thus compressing the C-seal. The resulting compression forces the plating layer to fill surface asperities in the area of the disk drive cover and base that contact the C-seal. These configurations purportedly provide assemblies with atmosphere leak rates of less than one cubic centimeter per 108 seconds or 5% of the volume of the sealed atmosphere over ten years.

U.S. Pat. No. 5,454,157 describes a disk drive assembly containing a metallic base and cover. In order to minimize escape of helium or nitrogen contained therein (via porosity in the metallic base and cover plates), a special electrostatic coating process and material called "E-coat" are used. E-coating, which is said to be a commercially available coating material and is known to be an insulative epoxy material, is applied to the surfaces of the base and cover as well as all other surfaces making up the hermetically sealed chamber. Such application of the E-coating takes place before the plates are assembled together. Every surface, inner and outer, of each plate is completely coated with a black E-coating as such. With the E-coating applied, the overall sealed chamber's porosity is purportedly lowered ninety-seven percent to an acceptable amount in order to contain the helium and nitrogen gas.

Elimination of or minimization of leakage is desired for not only better containment of gas within a hard disk drive, but for other reasons as well. One such reason relates to a reduction of complications arising from electromagnetic interference. Electromagnetic interference ("EMI," also called radio frequency interference or "RFI") is a usually undesirable disturbance caused in an electrical circuit by electromagnetic radiation emitted from an external source. Such disturbance may interrupt, obstruct, or otherwise degrade or limit the effective performance of the circuit. EMI can be induced intentionally for radio jamming, as in some forms of electronic warfare, or unintentionally, as a result of spurious emissions and responses, intermodulation products, and the like. A source of EMI may be any object, artificial or natural, that carries rapidly changing electrical currents, such as another electrical circuit or even the sun or Northern Lights. Broadcast transmitters, two-way radio transmitters, paging transmitters, and cable television are also potential sources of EMI within residential and commercial environments. Other potential sources of EMI include a wide variety of common household devices, such as doorbell transformers, toaster ovens, electric blankets, ultrasonic pest controls (e.g., bug zappers), heating pads, and touch-controlled lamps.

It is known that EMI frequently affects the reception of AM radio in urban areas. It can also affect cell phone, FM radio, and television reception, although to a lesser extent. EMI can similarly affect performance of a computer.

In conventional disk drives, unwanted and potentially problematic EMI wavelengths can enter a disk drive through a number of places. For example, similar to paths of gas leakage, such wavelengths can enter disk drive housings around screws used to hold multiple components of the housing together.

Within integrated circuits, the most important means of reducing EMI are: the use of bypass or "decoupling" capacitors on each active device (connected across the power supply and as close to the device as possible), risetime control of high-speed signals using series resistors, and VCC filtering. If all of these measures still leave too much EMI, shielding such as using radio frequency (RF) gasket seals (which are often very expensive) and copper tape has been employed. Another method of reducing EMI is via use of metal hard disk drive components. While the use of metal components undesirably increases the overall weight of an apparatus, use of metal components has been conventionally mandated in the hard disk drive industry due to the EMI sensitivity of mechanical spinning components therein. Without mechanical spinning components therein, however, manufacturers of flash drives have taken advantage of the benefits of, for example, a plastic case for enclosure of the drive. See, for example, U.S. Pat. No. 7,301,776, which describes how metal material used for top and bottom plates of the drives described therein can be replaced by plastic as there are fewer EMI issues associated with flash memory devices as compared to mechanical spinning hard disk drives.

Another source of potential hard disk drive failure stems from electrostatic discharge (ESD). ESD refers to a sudden and momentary electric current that flows between two objects at different electrical potentials. The term is usually used in the electronics and other industries to describe momentary unwanted currents that may cause damage to electronic equipment. Ways to eliminate problematic ESD are in need of improvement as performance demands of hard disk drives increase.

While the aforementioned problems typically arise based on events and/or materials external to a disk drive, other problems may arise based on events and/or materials internal to a disk drive. For example, design of components within conventional hard disk drives can contribute to hard disk drive failure. For example, plastic components are susceptible to outgassing and components made from conductive materials are prone to shedding of particles, both of which can cause catastrophic disk failure.

Alternative methods and apparatus for joining disk drive components are, thus, desired. While welding has been used for joining disk drive housing components, as discussed above, those methods have been conventionally limited in their applications and materials, focusing predominantly on joining of metal components conventionally used for disk drive housing components.

Laser welding was first demonstrated on thermoplastics in the 1970s, but has only recently found a place in industrial-scale situations (e.g., in the mass production of syringes). The technique uses a laser beam to melt the plastic in the joint region. The laser generates an intense beam of radiation (usually in the infrared area of the electromagnetic spectrum) that is focused on the material to be joined, providing very good control over the region heated and the amount of heat applied. Two general forms of laser welding exist: direct laser welding and transmission laser welding. Direct laser welding usually uses $CO_2$ laser radiation, which is readily absorbed by plastics, allowing quick joints to be made, but limiting the depth of penetration of the beam and restricting the technique to film applications. The shorter wavelength radiation produced by Nd:YAG, fiber and diode lasers is less readily absorbed by plastics, but these lasers are suitable for performing transmission laser welding. In this operation, it is necessary for one of the plastics to be transmissive to laser light and the other to absorb the laser energy, to ensure that the heating is concentrated at the joint region. Alternatively, an opaque surface coating may be applied at the joint to weld two transmissive plastics. Transmission laser welding is capable of welding thicker parts than direct welding, and since the heat-affected zone is confined to the joint region, no marking of the outer surfaces occurs.

In view of the number of potential problems impacting effective and long-term performance of disk drives, alternative methods and apparatus for improved sealing of disk drives are desired. Most desired are those methods and apparatus with improved efficiency and reliability over conventional attempts to provide the same.

SUMMARY OF THE INVENTION

A method of assembling a disk drive according to the invention comprises steps of: providing a base component of a housing of the disk drive; providing a cover component of the housing; mating the base component and the cover component to form an enclosed housing that encloses disk drive components for operation of the disk drive; optionally, evacuating and filling the enclosed housing with a desired gaseous medium; optionally, testing the disk drive; optionally; reworking the disk drive; and sealing the disk drive using low thermal energy bonding. In an exemplary embodiment, the step of sealing the disk drive comprises irreversibly hermetically sealing the disk drive.

According to one aspect of the invention, the step of mating the base component and the cover component to enclose the disk drive components results in a portion of the enclosed housing comprising an overlap of the base component and the cover component. In one embodiment, an outer of the base component and the cover component in the overlap is infrared-transmissive. In a further embodiment, the step of sealing the disk drive comprises using through transmission infrared bonding to seal the base component and the cover component at the overlap.

In one embodiment, an outwardly exposed bondline is formed between the base component and the cover component of the housing during the step of sealing the disk drive. In another embodiment, a bondline is formed within the housing at an internal interface between the base component and the cover component of the housing. According to a further embodiment, the bondline continuously extends around a periphery of the housing. The bondline can be formed in essentially one step or multiple steps.

According to one aspect of the invention, the step of sealing the disk drive comprises directing a source of low thermal energy toward an interface between the base component and the cover component of the housing. In one embodiment, an interface between the mated base component and the cover component comprises at least one thermoplastic material. According to a further embodiment, the step of sealing the disk drive comprises melting the thermoplastic material to form a bondline at the interface.

In one embodiment, the step of sealing the disk drive comprises providing a source of radiant low thermal energy (e.g., from an infrared light source). In another embodiment, the step of sealing the disk drive comprises providing a source of conductive low thermal energy (e.g., from a heated platen, a heated wheel, or a hot air gun).

In one embodiment of the method, at least one of the base component and the cover component comprises plastic. Exemplary plastics comprise polycarbonate and polybutylterepthalate.

A hermetically sealed disk drive of the invention comprises: a housing comprising a base and a cover; and disk drive components enclosed within the housing for operation of the disk drive, wherein the housing comprises a bondline continuously extending around a periphery of the housing for sealing the same. Preferably, at least one of the base and the cover comprises plastic. In one embodiment, the bondline is outwardly exposed at an interface between the base and the cover. In another embodiment, the bondline is at an internal interface between the base and the cover.

BRIEF DESCRIPTION OF THE DRAWINGS

Note that the components and features illustrated in all figures throughout this application are not necessarily drawn to scale and are understood to be variable in relative size and placement. Similarly, orientation of the components and features within the figures can vary such that, for example, a horizontal configuration could be readily reoriented to a vertical configuration, and vice versa, as desired.

DETAILED DESCRIPTION OF THE PREFERRED EMBODIMENTS OF THE INVENTION

A disk drive conventionally includes a base to which various components of the disk drive are mounted. A top cover cooperates with the base to form a housing that defines an encased environment for the disk drive. The components within the disk drive include, for example, a spindle motor, which rotates one or more magnetic disks at a constant high speed, and an actuator assembly for writing information to and reading information from circular tracks on the disks. The actuator assembly typically includes a plurality of actuator arms extending towards the disks, with one or more flexures extending from each of the actuator arms. Mounted at the distal end of each of the flexures is a read/write head, which includes an air bearing slider enabling the head to fly in close proximity above the corresponding surface of the associated disk during operation of the disk drive. When the disk drive is powered down, the heads may be moved to a landing zone at an innermost region of the disks where the air bearing sliders are allowed to land on the disk surface as the disks stop rotating. Alternatively, the actuator assembly may move (unload) the heads beyond the outer circumference of the disks so that the heads are supported away from the disk surface by a load/unload ramp when the drive is powered down.

Figure 1:
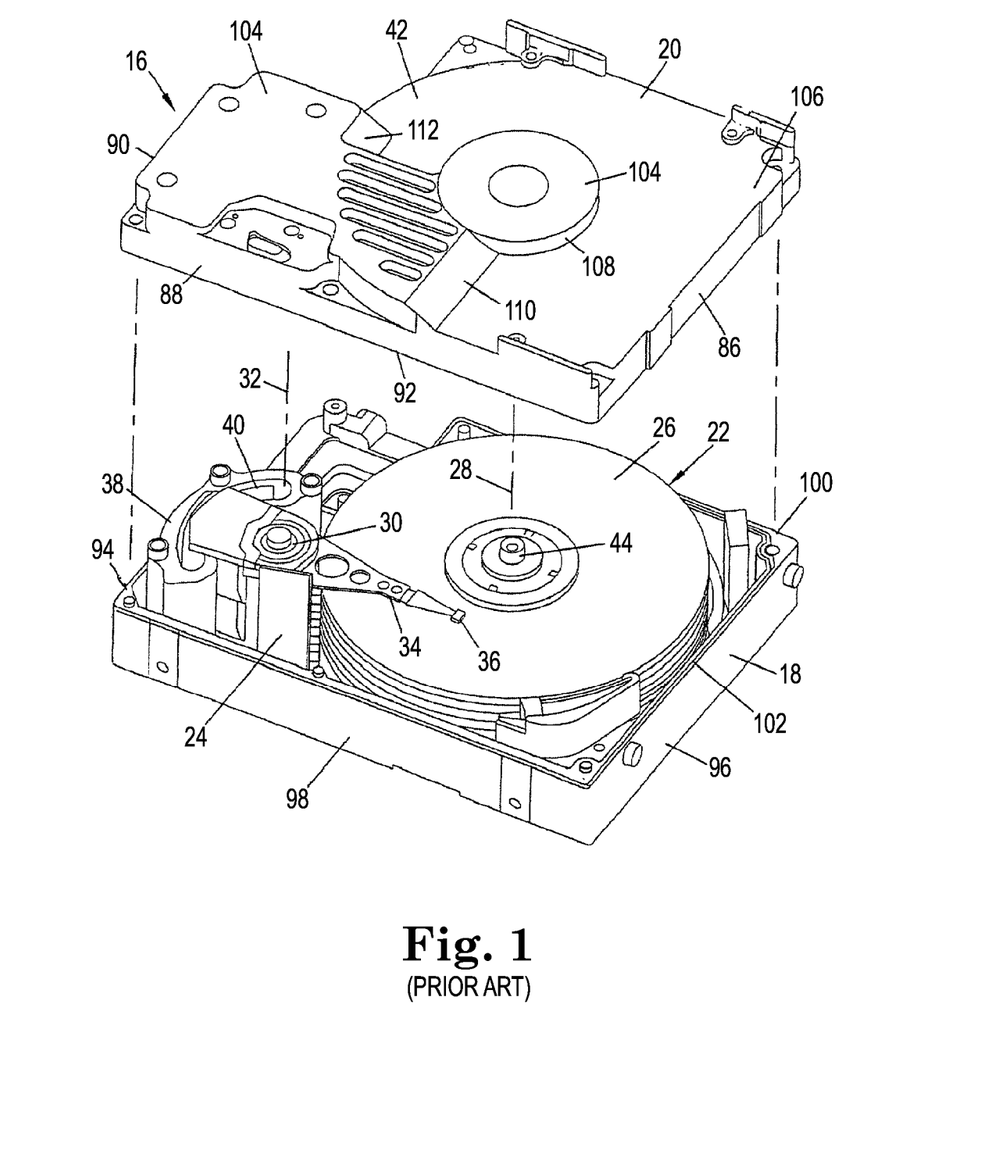
FIG. 1 is a partial perspective view of a prior art hard disk drive with the top cover of the drive housing removed to illustrate certain features.

The present invention is beneficially applied in, for example, hard disk drive applications. Turning now to the drawings, there is shown in FIG. 1 part of a prior art hard disk drive 16. The prior art hard disk drive 16 illustrated in FIG. 1 is only one example of many well-known embodiments of hard disk drives and is illustrated to show exemplary components of hard disk drives for use as a reference in conjunction with a description of the present invention. Recognize, however, that many conventional hard disk drives and other disk drives can be modified according to the improvements of the invention.

As shown in FIG. 1, a conventional hard disk drive 16 has a rigid outer housing including a base 18 and a cover 20. In FIG. 1, the cover 20 is removed from the base 18 to reveal a disk pack or spindle assembly 22 and a rotary actuator 24, both of which are mounted moveably with respect to the housing. More particularly, the spindle assembly 22 includes a top disk 26 and several additional concentrically stacked and spaced-apart disks rotatable about a vertical spindle axis 28.

Rotary actuator 24 includes an actuator shaft 30 mounted to pivot relative to the base 18 about a vertical actuator axis 32. Several transducer support arms, including a top support arm 34, are fixed to rotate with the actuator shaft 30. Each arm carries a magnetic data transducing head—e.g., a transducing head 36 on a support arm 34. The rotary actuator 24 pivots to move the transducing head 36 along arcuate paths generally radially with respect to the disks. Selective actuator 24 pivoting, in combination with controlled rotation of the disks, allows reading and recording of data at any desired location at any one of the disk recording surfaces. Rotary actuator 24 is pivoted by selective application of an electrical current to a voice coil 38 supported for arcuate movement within a magnetic field created by a permanent magnet arrangement 40, which includes several magnets and a poll piece (both of which are not illustrated in further detail).

The rotary actuator 24 and spindle assembly 22 are supported between two opposed housing walls, including a top wall 42 of the cover 20 and a bottom wall of the base 18. Spindle shaft 44 and the actuator shaft 30 may be stationary—meaning that they are integral with the housing—with the disks and support arms being mounted to rotate relative to their respective shafts.

The cover 20 includes a vertical continuous sidewall structure including a rearward wall 86, a sidewall 88, and a forward wall 90. Here, the upper sidewall structure includes a generally flat, horizontal continuous bottom edge 92, though some embodiments may include a flange or other mated fitting so as to fit into a top edge 100 of base 18 facilitating a tight fit and/or welding. The base 18 includes an upright wall structure including a forward wall 94, a rearward wall 96, and two opposed sidewalls, one of which is shown at 98. These walls combine to form a continuous, horizontal top edge 100. FIG. 1 also illustrates an elastomeric gasket seal 102 mounted to top edge 100 of the base 18. When the cover 20 is assembled onto the base 18, the confronting bottom edge 92 of the cover 20 and the top edge 100 of the base 18 are brought into sealing engagement to close the housing about the spindle assembly 22 and the rotary actuator 24.

The upper and lower sidewalls 88, 98 are generally relatively thick to lend rigidity to the housing. The top wall 42 of the cover 20 may be formed with a horizontal full height region 104 and a horizontal recessed region 106, the two types of regions being interconnected by several non-horizontal regions as indicated at 108, 110 and 112. One portion of the full height region 104 accommodates the rotary actuator 24 and the spindle assembly 22. The non-horizontal regions 108, 110, 112 provide additional stiffness to the top wall 42 of the cover 20, which strengthens the top wall 42 and enables a reduced thickness wall construction.

During an exemplary method of assembly of a disk drive according to the invention, disk driving housing components (e.g., a base and a cover) are provided and enclosed around components internal to the disk drive. This is often done within a clean room environment. When an electrical connector is also to be assembled such that it protrudes external to the housing, it is likewise often assembled within the clean room environment. Any suitable mechanism can be used to mechanically couple components of the disk drive housing.

In one embodiment of a method of assembling a hermetically sealed disk drive, the base and cover are assembled around components internal to the disk drive in not only a clean room environment, but also in an environment filled with the desired gaseous medium (when the desired medium is other than atmospheric air). In another embodiment, after enclosing the base and the cover around internal components to the disk drive and temporarily sealing the disk drive housing any suitable methodology as known to those skilled in the art, the disk drive is evacuated and filled with the desired gaseous medium (when the desired medium is other than atmospheric air). A fill port or other conventional methodology can be used for filling the disk drive with the desired gaseous medium using any suitable methodology as known to those skilled in the art according to this embodiment. The disk drive then preferably undergoes routine, but optional, testing and re-working, if necessary. Prior to testing of the disk drive, the disk drive may be temporarily sealed using techniques known to those skilled in the art. In an exemplary embodiment, the disk drive is temporarily sealed using a temporary sealing tape, such as those described in in co-pending U.S. patent application Ser. No. 13/096,826, entitled "Temporary Sealing of Hermetic Hard Disk Drives," which is incorporated by reference herein in its entirety. Once any optional testing and re-working is completed, the disk drive is sealed according to methods of the present invention. In an exemplary embodiment, the disk drive is irreversibly hermetically sealed according to methods of the present invention.

According to the invention, disk drives are sealed using low thermal energy bonding techniques. Advantageously, by using low thermal energy bonding techniques, interference with proper function of the disk drive is minimized. In contrast, other conventional methodologies for bonding surfaces using higher and/or other types of energy (e.g., induction welding, electromagnetic pulsing, and the like) are known to interfere with proper functioning of sensitive electronic devices like disk drives.

While generally lower than that applied using conventional methodology, thermal energy applied when sealing hard disk drives according to methods of the invention is in an amount sufficient to at least fuse, and preferably melt, material(s) comprising a bondline formed during the sealing process. Nevertheless, temperature applied to seal hard disk drives according to the invention is generally less than the decomposition temperature of material(s) adjacent to or comprising a bondline formed when sealing the hard disk drive. Preferably, the temperature applied to seal the hard disk drive is approximately the melting temperature of material(s) adjacent to or comprising the bondline. In one embodiment, low thermal energy bonding according to the invention occurs at application temperatures less than about 500° C. In a further embodiment, low thermal energy bonding according to the invention occurs at application temperatures less than about 400° C. In yet a further embodiment, low thermal energy bonding according to the invention occurs at application temperatures less than about 300° C. In still a further embodiment, low thermal energy bonding according to the invention occurs at application temperatures less than about 200° C.

In one embodiment, the step of sealing the disk drive comprises providing a source of radiant low thermal energy. An exemplary source of low thermal energy comprises an infrared light source. While an infrared light source would not be expected to sufficiently bond metallic materials, an infrared light source is sufficient to thermally bond preferred disk drives of the present invention.

In another embodiment, the step of sealing the disk drive comprises providing a source of conductive low thermal energy (e.g., from a heated platen, a heated wheel, or a hot air gun). An exemplary heated platen is that available from Carver, Inc. (Wabash, Ind.) and having Model No. 4122.

In an exemplary embodiment, at least one of the components of the disk drive housing consists essentially of an infrared-transmissive material. In a further embodiment, each of the components of the disk drive housing consists essentially of an infrared-transmissive material. A preferred infrared-transmissive material is plastic. Suitable plastic materials include, for example, polycarbonate and polybutylterephthalate.

Use of plastic affords many advantages. The lighter weight provided by such materials as opposed to conventional metallic housing materials translates into lighter weight assemblies including the disk drive, which makes for not only often more desirable features for the user of such assemblies but also beneficially reduces manufacturing and shipping costs associated with such assemblies. Advantageously, by focusing a low thermal energy source at the location of the desired bondline, problematic outgassing from organic materials (e.g., plastic) can be minimized according to exemplary embodiments of the invention.

When sealing a disk drive according to the invention, a source of low thermal energy is directed toward the disk drive housing at a position desired for formation of a bondline. In general, suitable positions for formation of a bondline according to the invention are those comprising an interface between components of the disk drive housing. The interface at which a bondline is formed preferably comprises at least one thermoplastic material. One or more of the disk drive housing components may be formed from the thermoplastic material or a separate thermoplastic material may be provided at the interface. Heat from the low thermal energy source fuses or melts at least one thermoplastic material at the interface when sealing the disk drive according to the invention. In a preferred embodiment, to bolster sealing of the disk drive, a bondline formed according to the invention continuously extends around a periphery of the disk drive housing.

In one embodiment, an outwardly exposed bondline is formed between components of the disk drive housing. For example, the outwardly exposed bondline can be formed by directing an infrared light source at an outwardly exposed interface between components of the disk drive housing. The infrared light is converted into heat by an infrared-absorbent material at the interface (e.g., a thermoplastic having a dark color, a metal having a dark color, an infrared-absorbent dye, certain heat-activated adhesives, combinations thereof and the like).

During the bonding process, an external force may be applied to clamp together the housing components as necessary, facilitating conduction of heat from the infrared-absorbent material to the thermoplastic material at the interface, fusing or melting the thermoplastic component and creating a bondline. Thermal expansion in the bonding zone creates an internal pressure and leads to a strong bond between the components.

In another embodiment, a bondline is formed within the disk drive housing at an internal interface between overlapping components of the disk drive housing. For example, the bondline can be formed at a position approximately halfway through the thickness of the enclosed disk drive housing where components of the housing overlap. According to an exemplary aspect of this embodiment, a disk drive's housing components are thermally bonded using through transmission infrared (TTIr) bonding.

TTIr bonding is advantageous as compared to many conventional bonding technologies in that it facilitates formation of precise bondlines as well as high volume manufacture of disk drives. Use of plastic for at least one of the housing components (e.g., the cover and the base) facilitates efficient use of TTIr bonding for sealing of the disk drive. In contrast, when the housing comprises metal components, as is conventional, infrared bonding generally is compromised in its ability to effectively seal the housing due to the tendency of infrared radiation to reflect from metal surfaces instead of being absorbed by the surfaces in order to heat and melt the same into an effective bond. Further, use of TTIr bonding with plastic housing components was found to minimize outgassing of components from the plastic components, in contrast to what is encountered during conventional bonding techniques, due to the ability of TTIr bonding to provide localized and controlled heating of the plastic components at the bondline on which the infrared radiation is incident.

During one embodiment of TTIr bonding according to the invention, an infrared light source penetrates an outer (i.e., top) infrared-transmissive material (e.g., a transparent thermoplastic) and is converted into heat by a bottom infrared-absorbent material (e.g., a thermoplastic having a dark color, a metal having a dark color, an infrared-absorbent dye, certain heat-activated adhesives, combinations thereof and the like). The top disk drive housing component at the overlap comprises the infrared-transmissive material. While the top disk drive housing component may consist essentially of the infrared-transmissive material, at least that portion of the component proximate the bondline to be formed comprises the infrared-transmissive material. The bottom disk drive housing component at the overlap may comprise the infrared-absorbent material or a separate infrared-absorbent material may be provided at the interface between the housing components. When the bottom disk drive housing component comprises the infrared-absorbent material, at least that portion of the component proximate the bondline to be formed comprises the infrared-absorbent material.

Any suitable device can be used for TTIr bonding. During the bonding process, an external force may be applied to clamp together or otherwise provide pressure to the top and bottom components as necessary, facilitating conduction of heat from the infrared-absorbent material to the infrared-transmissive material, fusing or melting at least the infrared-transmissive material and creating a bondline. To optimize processing efficiency, a device applying pressure and thermal energy may be used to obviate the need for clamping of the housing components when bonding the same. Thermal expansion in the bonding zone creates an internal pressure and leads to a strong bond between the components.

The bondline of a sealed disk drive according to the invention may be formed in essentially one or multiple steps. In an exemplary embodiment of TTIr bonding according to the invention, irradiation of an interface with an infrared light source having a wavelength of about 850 nanometers is capable of forming a seal according to the invention in about 20 seconds or less of such infrared exposure time. In a further exemplary embodiment, such a bond can be efficiently formed in, for example, about seven seconds of infrared exposure time.

Figure 2A:
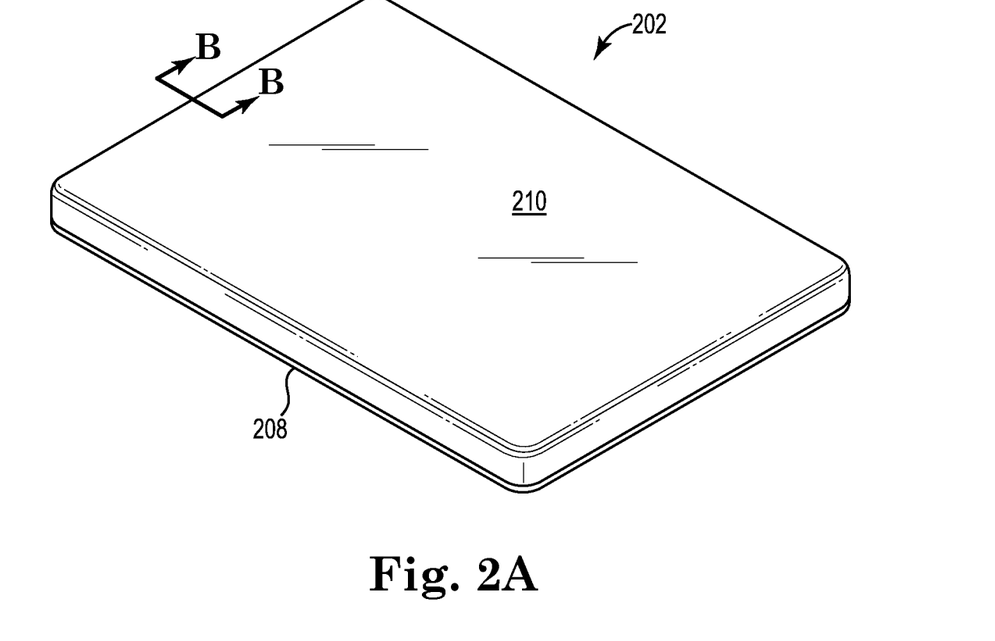
FIG. 2A is a top perspective view of a hard disk drive housing coupled according to the invention.
Figure 2B:
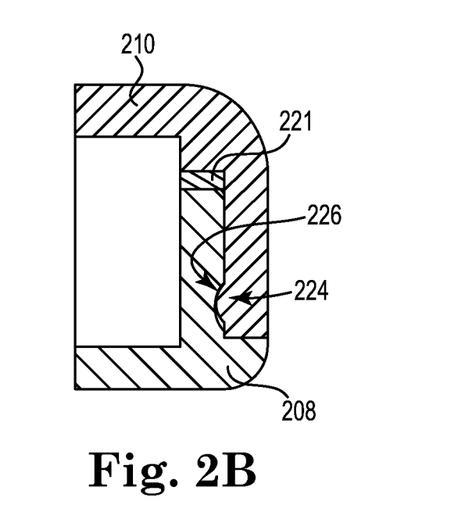
FIG. 2B is a partial cross-sectional view of the hard disk drive housing of FIG. 2A, taken along plane B-B of FIG. 2A.
Figure 2C:
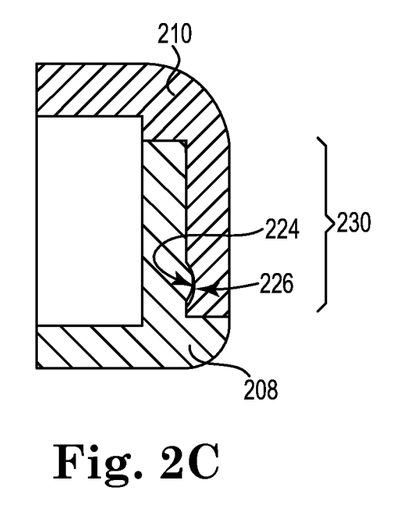
FIG. 2C is a partial cross-sectional view of an alternate embodiment of the hard disk drive housing of FIG. 2A, taken along plane B-B of FIG. 2A.

An exemplary sealing method comprises low thermal energy bonding of snap-coupled housing components, such as those described in co-pending U.S. patent application Ser. No. 13/096,862, entitled "Improved Coupling of Hard Disk Drive Housing and Related Methods," which is incorporated by reference herein in its entirety. According to one embodiment of this aspect of the invention, as illustrated in FIGS. 2A-2C, a base 208 and a cover 210 are snap-fit (also referred to herein as snap-coupled) together to form an enclosed disk drive housing 202 comprising internal hard disk drive components between the base 208 and the cover 210 as illustrated in FIG. 2A. According to one embodiment, as illustrated in FIGS. 2B-2C, the base 208 and the cover 210 are mechanically coupled via integrally formed male- and female-type connectors. In one variation of this embodiment, as illustrated in FIG. 2B, the cover 210 comprises a male-type connector 224 mechanically coupled to a female-type connector 226 of the base 208. In an alternate variation of this embodiment, as illustrated in FIG. 2C, the base 208 comprises a male-type connector 224 mechanically coupled to a female-type connector 226 of the cover 210.

Any suitable male- and female-type connectors may be used. For example, the male-type connector 224 comprises a ridge and the female-type connector 226 comprises a groove according to a preferred embodiment. As such, the base 208 and the cover 210 are snap-fit together.

In an exemplary embodiment, at least one of the base 208 and the cover 210 of the disk drive housing 202 consists essentially of a non-metallic material (e.g., a plastic). In a further embodiment, each of the base 208 and the cover 210 of the disk drive housing 202 consists essentially of a non-metallic material (e.g., a plastic). Use of non-metallic materials, such as plastic, affords many advantages. For example, as described above, use of such materials facilitates lighter weight hard disk drives and associated cost savings.

Another advantage of the present invention relates to tension introduced within the housing components snap-coupled together insofar as it obviates the need for clamping of the components when bonding them together according to exemplary methods of sealing disk drives according to the invention. Advantageously, when snap-coupled together according to the invention, the base 208 and the cover 210 of the disk drive housing 202 can be more efficiently bonded using such bonding methods in that the additional step of clamping the components being bonded is not required. In such an embodiment, the step of enclosing the disk drive between the base 208 and the cover 210 results in a portion of the enclosed housing 202 comprising an overlap 230 of the base 208 and the cover 210, as illustrated in FIG. 2C. The disk drive can be sealed using low thermal energy bonding according to the invention in order to mechanically couple the base 208 and the cover 210 at the overlap 230. To facilitate such bonding, the outer component (i.e., that component which is outwardly exposed) of the base 208 and the cover 210 in the overlap 230 is infrared-transmissive in one embodiment.

During exemplary manufacture and assembly of a hard disk drive 202 according to the invention, a cover 210 and a base 208 are provided and enclosed around components internal to the hard disk drive 202 within a clean room environment. During the process of enclosing the cover 210 and base 208 around the internal components, any suitable sealing material 221 may optionally be positioned between the cover and base, such as is shown in FIG. 2B, for sealing engagement of the hard disk drive 202 housing in an exemplary embodiment. For example, conventional rubber gasket seals or other sealing materials such as irradiation-crosslinked, closed-cell foam (e.g., that commercially available under the VOLARA trade designation—Sekisui Voltek of Lawrence, Mass.) can be used for such a seal. Such a sealing engagement facilitates short-term and reversible hermetic sealing of the hard disk drive 202.

As an alternative to use of conventional sealing materials positioned between the cover 210 and the base 208, which conventional sealing materials typically decrease processing efficiency and increase manufacturing costs, a temporary sealing tape can used to seal the interface between the cover 210 and the base 208 according to one method of the invention. Any suitable adhesive tape can be used for this purpose in facilitating short-term and reversible hermetic sealing of the hard disk drive 202. Exemplary temporary sealing tapes are described in co-pending U.S. patent application Ser. No. 13/096,826, entitled "Temporary Sealing of Hermetic Hard Disk Drives," which is incorporated by reference herein in its entirety.

In an exemplary embodiment, the base 208 and the cover 210 of the hard disk drive 202 are assembled around components internal to the hard disk drive 202 in not only a clean room environment, but also an environment filled with the desired gaseous medium (when the desired medium is other than atmospheric air). In another embodiment, after enclosing the base 208 and the cover 210 around internal components to the hard disk drive 202 and temporarily sealing the disk drive housing any suitable methodology as known to those skilled in the art, the hard disk drive 202 is evacuated and filled with the desired gaseous medium (when the desired medium is other than atmospheric air). A fill port or other conventional methodology can be used for filling the hard disk drive 202 with the desired gaseous medium using any suitable methodology as known to those skilled in the art according to this embodiment. The hard disk drive 202 then preferably undergoes routine testing and re-working, if necessary. Once the hard disk drive 202 passes such testing, the hard disk drive 202 is sealed according to the invention.

In addition to processing advantages imparted by methods of the present invention, advantages associated with disk drives of the invention include elimination of the conventional requirement for use of mechanical fasteners when joining and sealing disk drive housing components. In order to adequately seal the gaseous medium within a hermetic hard disk drive, for example, use of discrete mechanical fasteners is not necessary and avoided in preferred embodiments.

Further, disk drives comprising seals of the present invention advantageously provide, for example, improved shielding from EMI as well as improved containment of a gaseous medium within an enclosed disk drive. Within the sealed environment of hermetically sealed disk drives of the invention, a gas having a density less than that of atmospheric air can be effectively employed. For example, a gaseous medium comprising at least one of nitrogen, helium, or other noble gases can be employed therein, alone or in combination with one or more of each other and/or air.

In an exemplary embodiment, an improved disk drive of the invention is capable of providing and maintaining an adequate irreversibly hermetically sealed environment for at least five years. An adequate irreversibly hermetically sealed environment is one in which disk drive performance is not significantly affected due to leakage. According to one embodiment, at least about 90% by volume, preferably at least about 95% by volume, of a gaseous medium originally contained within a disk drive remains after five years. Any suitable methodology can be used to detect leakage of a gaseous medium from a disk drive and amounts thereof.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. Further, while the present invention has been described with respect to disk drives, such as hard disk drives, it should be understood that the present invention also finds utility in other data storage devices—e.g., optical and magneto-optical storage devices.

The invention claimed is:

1. A method of assembling a disk drive, the method comprising steps of:
   providing a base component of a housing of the disk drive;
   providing a cover component of the housing;
   mating the base component and the cover component to form an enclosed housing that encloses disk drive components for operation of the disk drive, wherein an interface between the mated base component and the cover component comprises at least one thermoplastic material;
   optionally, evacuating and filling the enclosed housing with a desired gaseous medium;

optionally, testing the disk drive;
optionally, re-working the disk drive; and
sealing the enclosed housing of the disk drive using low thermal energy bonding,
wherein a bondline is formed within the enclosed housing by at least fusing the at least one thermoplastic material at the interface between the base component and the cover component of the enclosed housing, and
wherein the step of mating the base component and the cover component to enclose the disk drive components results in a portion of the enclosed housing comprising an overlap of the base component and the cover component, wherein an outer of the base component and the cover component in the overlap is infrared-transmissive.

2. The method of claim 1, wherein the step of sealing the enclosed housing of the disk drive comprises irreversibly hermetically sealing the disk drive.

3. The method of claim 1, wherein at least one of the base component and the cover component comprises plastic.

4. The method of claim 3, wherein the plastic is polycarbonate or polybutylterepthalate.

5. The method of claim 1, wherein the step of sealing the enclosed housing of the disk drive comprises directing a source of low thermal energy toward an interface between the base component and the cover component of the housing.

6. The method of claim 1, wherein the bondline formed between the base component and the cover component of the housing during the step of sealing the enclosed housing of the disk drive is outwardly exposed.

7. The method of claim 1, wherein the bondline continuously extends around a periphery of the housing.

8. The method of claim 7, wherein the bondline is formed in essentially one step.

9. The method of claim 1, wherein the step of sealing the enclosed housing of the disk drive comprises providing a source of radiant low thermal energy.

10. The method of claim 1, wherein the step of sealing the enclosed housing of the disk drive comprises providing a source of conductive low thermal energy.

11. The method of claim 1, wherein the step of sealing the enclosed housing of the disk drive comprises providing a heated platen.

12. The method of claim 1, wherein the bondline is formed within the enclosed housing at an internal interface between the base component and the cover component of the housing.

13. The method of claim 1, wherein the bondline is formed within the enclosed housing by melting the at least one thermoplastic material at the interface between the base component and the cover component of the enclosed housing.

14. The method of claim 13, wherein the low thermal energy bonding occurs at application temperatures less than about 300° C.

15. The method of claim 13, wherein the low thermal energy bonding occurs at application temperatures less than about 200° C.

16. The method of claim 1, wherein each of the base component and the cover component consists essentially of plastic.

17. The method of claim 1, wherein at least one of the base component and the cover component comprises the at least one thermoplastic material.

18. A method of assembling a disk drive, the method comprising steps of:
providing a base component of a housing of the disk drive;
providing a cover component of the housing;
mating the base component and the cover component to form an enclosed housing that encloses disk drive components for operation of the disk drive, wherein an interface between the mated base component and the cover component comprises at least one thermoplastic material;
optionally, evacuating and filling the enclosed housing with a desired gaseous medium;
optionally, testing the disk drive;
optionally, re-working the disk drive; and
sealing the enclosed housing of the disk drive using low thermal energy bonding,
wherein a bondline is formed within the enclosed housing by melting the at least one thermoplastic material at the interface between the base component and the cover component of the enclosed housing, and
wherein the step of mating the base component and the cover component to enclose the disk drive components results in a portion of the enclosed housing comprising an overlap of the base component and the cover component, wherein an outer of the base component and the cover component in the overlap is infrared-transmissive.

19. The method of claim 18, wherein the bondline continuously extends around a periphery of the housing.

20. A method of assembling a disk drive, the method comprising steps of:
providing a base component of a housing of the disk drive;
providing a cover component of the housing;
mating the base component and the cover component to form an enclosed housing that encloses disk drive components for operation of the disk drive and wherein at least one of the base component and the cover component at an interface between the mated base component and the cover component comprises at least one thermoplastic material;
optionally, evacuating and filling the enclosed housing with a desired gaseous medium;
optionally, testing the disk drive;
optionally, re-working the disk drive; and
sealing the enclosed housing of the disk drive using low thermal energy bonding,
wherein a bondline is formed within the enclosed housing by at least fusing the at least one thermoplastic material at the interface between the base component and the cover component of the enclosed housing and without separate thermoplastic material at that interface.

21. A method of assembling a disk drive, the method comprising steps of:
providing a base component of a housing of the disk drive;
providing a cover component of the housing;
mating the base component and the cover component to form an enclosed housing that encloses disk drive components for operation of the disk drive, wherein the base component and the cover component are mechanically coupled via male- and female-type connectors, and wherein an interface between the mated base component and the cover component comprises at least one thermoplastic material;
optionally, evacuating and filling the enclosed housing with a desired gaseous medium;
optionally, testing the disk drive;
optionally, re-working the disk drive; and
sealing the enclosed housing of the disk drive using low thermal energy bonding,
wherein a bondline is formed within the enclosed housing by at least fusing the at least one thermoplastic material at the interface between the base component and the cover component of the enclosed housing.

22. The method of claim 21, wherein the step of mating the base component and the cover component to enclose the disk drive components results in a portion of the enclosed housing comprising an overlap of the base component and the cover component.

23. The method of claim 22, wherein an outer of the base component and the cover component in the overlap is infrared-transmissive.

24. The method of claim 23, wherein the step of sealing the enclosed housing of the disk drive comprises using through transmission infrared bonding to seal the base component and the cover component at the overlap.

25. The method of claim 21, wherein the male- and female-type connectors are integrally formed.

26. The method of claim 21, wherein the male-type connector comprises a ridge and the female-type connector comprises a groove.

27. A method of assembling a disk drive, the method comprising steps of:
providing a base component of a housing of the disk drive;
providing a cover component of the housing;
mating the base component and the cover component to form an enclosed housing that encloses disk drive components for operation of the disk drive, wherein the base component and the cover component are snap-fit together, and wherein an interface between the mated base component and the cover component comprises at least one thermoplastic material;
optionally, evacuating and filling the enclosed housing with a desired gaseous medium;
optionally, testing the disk drive;
optionally, re-working the disk drive; and
sealing the enclosed housing of the disk drive using low thermal energy bonding,
wherein a bondline is formed within the enclosed housing by at least fusing the at least one thermoplastic material at the interface between the base component and the cover component of the enclosed housing.

* * * * *